(12) United States Patent
Christensen et al.

(10) Patent No.: US 6,243,502 B1
(45) Date of Patent: Jun. 5, 2001

(54) IMAGE QUALITY MAINTENANCE

(75) Inventors: James Christensen, Cortlandt Manor; Jack C. Lee, Yorktown Heights, both of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/133,715

(22) Filed: Aug. 13, 1998

(51) Int. Cl.[7] ..................................... G06K 9/54
(52) U.S. Cl. ........................... 382/305; 382/254
(58) Field of Search ............................... 382/305, 306, 382/254, 112; 707/523, 522

(56) References Cited

U.S. PATENT DOCUMENTS

| | | | |
|---|---|---|---|
| 5,768,446 | * 6/1998 | Reasoner, Jr. et al. | 382/305 |
| 5,963,659 | * 10/1999 | Cahill et al. | 382/309 |
| 6,081,251 | * 6/2000 | Sakai et al. | 382/306 |

* cited by examiner

Primary Examiner—Yon J. Couso
(74) Attorney, Agent, or Firm—Louis P. Herzberg

(57) ABSTRACT

A method and system is presented for improving and/or maintaining the quality of a digital image file by preserving information that was included at image capture and lost during an image editing/processing operation. Generally, image-description information is stored in structured fields that collectively are described as the image's header. The image's header are stored in an image's file in addition to the image's pixel values. This invention produces and maintains a level of quality of the original enriched image files. This is accomplished by extracting image-description information prior to the processing of an image by an editing package, by selecting, storing and preserving the image-descriptive information data. The so stored data is combined with the editing package's processed image file, to produce an enriched processed image file. The enriched files includes the preserved data which would otherwise be discards. Header information is saved before an image manipulation process is performed. After the image is modified, all or portions of the header information is reinserted into the processed image file. For example, this may be used to preserve header information used to identify and maintain the color fidelity of the original scanned image. Any other information in the header may also be preserved for later use. This may include such things as image description, copyright, etc.

29 Claims, 4 Drawing Sheets

IMAGE QUALITY MAINTENANCE

FIELD OF THE INVENTION

The present invention is directed to the field of image processing. It is more specifically directed to digital image processing methods and systems.

BACKGROUND OF THE INVENTION

Scientists and engineers continue to make improvements in the ways images are scanned and/or stored in digital format. Generally, image-description information is stored in structured fields that collectively are described as the image's header. The image's header are stored in an image's file in addition to the image's pixel values. For example, the TIFF file format produced and trademarked by Aldus Corporation, (411 First Ave. South, Seattle, Wash.), defines many such structured fields.

There are continually developing image editing packages which are employed to use and perform various processing tasks to the stored image files. Because of the large number of possible structured fields, many image-editing packages recognize only a fraction of the fields defined. A result of the lack of recognition of some fields, is that the information stored in these unrecognized fields is often lost. Thus, following the completion of the processing task performed by the editing package, the image file is reformed in processed files that lack the fields that are not recognized. For example, a very popular editing package, Adobe PhotoShop, (sold by Adobe Systems Incorporated, 1585 Charleston Rd., Mountain View, Calif.) deletes the image-description information and the color interpretation of the image's pixel values.

It should be apparent that the removal of the image-description information often degrades the value and quality of the reformed image. Furthermore, it can impede the operation of subsequent image processes and/or systems that would otherwise use this removed information in their operation. Generally the lost information include information that would ordinarily serve various purposes. For example, metadata (a totality of image textural catalog information) that describes an image's content may be stored in an image's header for subsequent use in indexing the image in a database. The removal of a part or all of the metadata may render the file not to be able to be indexed by an image system at some later time.

In order to better understand the present invention, the invention is described in regard to a particular imaging format. The format described is the TIFF format having the following tags definitions:

| | |
|---|---|
| ImageWidth | (100 hex) - width of the image in pixels. |
| ImageLength | (101 hex) - length of the image in pixels. |
| BitPerSample | (102 hex) - number of bits per color plane. |
| Orientation | (112 hex) - The correct orientation with respect to rows and columns of the data. |
| SamplesPerPixel | (115 hex) - number of color planes. |
| ImageDescription | (10E hex) - ASCII field that describe the content. |
| StripOffsets | (111 hex) - the length of the header and where the data starts in the file. |
| TransferFunction | (12D hex) - A lookup table to convert the data. |
| DateTime | (132 hex) - the time stamp when file is created |
| WhitePoint | (13E hex) - the chromaticities of the white point. |
| PrimaryChromaticities | (13F hex) - the chromaticities of the color. |
| Copyright | (8298 hex) - ASCII field of the copyright message. |

Tables 1 and 2, show a structure of the TIFF files at each stage of the process before the present invention. It is noted that the tags listed are not an exhaustive list of tags that a TIFF file may have. The group of tags is selected only to show one particular utilization. Table 1 shows an example of a header and data for an original image file with the structured fields/tags before the file is edited by PhotoShop.

TABLE 1

Original Scanned File Structure:

| | | |
|---|---|---|
| Header: | Width | tag |
| | Length | tag |
| | BitPerSample | tag |
| | SamplesPerPixel | tag |
| | Orientation | tag |
| | Offset | tag |
| | Description | tag |
| | TransferFunction | tag |
| | DateTime | tag |
| | WhitePoint | tag |
| | PrimaryChromaticities | tag |
| | Copyright | tag |
| Data: | (bytes of image data) XXXXXXXXX XXX XXXXX | |

Table 2 shows an example of a modified file structure of fields/tags after the image file is edited by PhotoShop. It is noted that Table 2 no longer has tags for ImageDescription, TransferFunction, DateTime, WhitePoint, PrimaryChromaticities or Copyright. All information in these tags is lost for subsequent image files for all further processing an/or viewing.

TABLE 2

Modified File Structure:
(Example: After editing image with PhotoShop)

| | | |
|---|---|---|
| Header: | New Width | tag |
| | New Length | tag |
| | BitPerSample | tag |
| | SamplesPerPixel | tag |
| | Orientation | tag |
| | new Offset | tag |
| Data: | (bytes of image data) YYYY YY YYYYYY YYYY | |

SUMMARY OF THE INVENTION

Thus it is an object of this invention to maintain and reproduce enriched image files even after the image file is operated upon by one or more processes. This is accomplished by extracting image-description/quality information included in the original image file, prior to the processing of the image by an editing package. In one embodiment, this information is selected and stored so as to be preserved for later reinsertion. The so stored data is reinserted into the editing package's processed image file, to produce an enriched processed image file. The enriched files includes the preserved data which would otherwise be discarded.

An aspect of this invention is to save header information before an image manipulation process is performed. After the image is modified, the saved information is re-inserted into the image file. For example, this may be used to preserve header information used to identify and maintain the quality and color fidelity of the original scanned image. Any other information in the header may also be preserved for later use. This may include such things as file description, copyright, etc.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

This invention presents a method, apparatus and image processing system to preserve and maintain important information generated and inserted at the creation of an image file. This preserved information continually provides a replica of the original generated quality to the image files even after the files are modified by an image editing process.

In some embodiments of this invention, a subset or entirety of the originally generated image data file generally represented as tagged information, is saved for the image so that it may be reinserted after some manipulation of that image file have been performed. The reinsertion and subsequent use of the partial or entire saved information results in a better quality image. It can also be used to preserve other important attributes that may have been present in the original image file and lost during a file manipulation.

Figure 1:
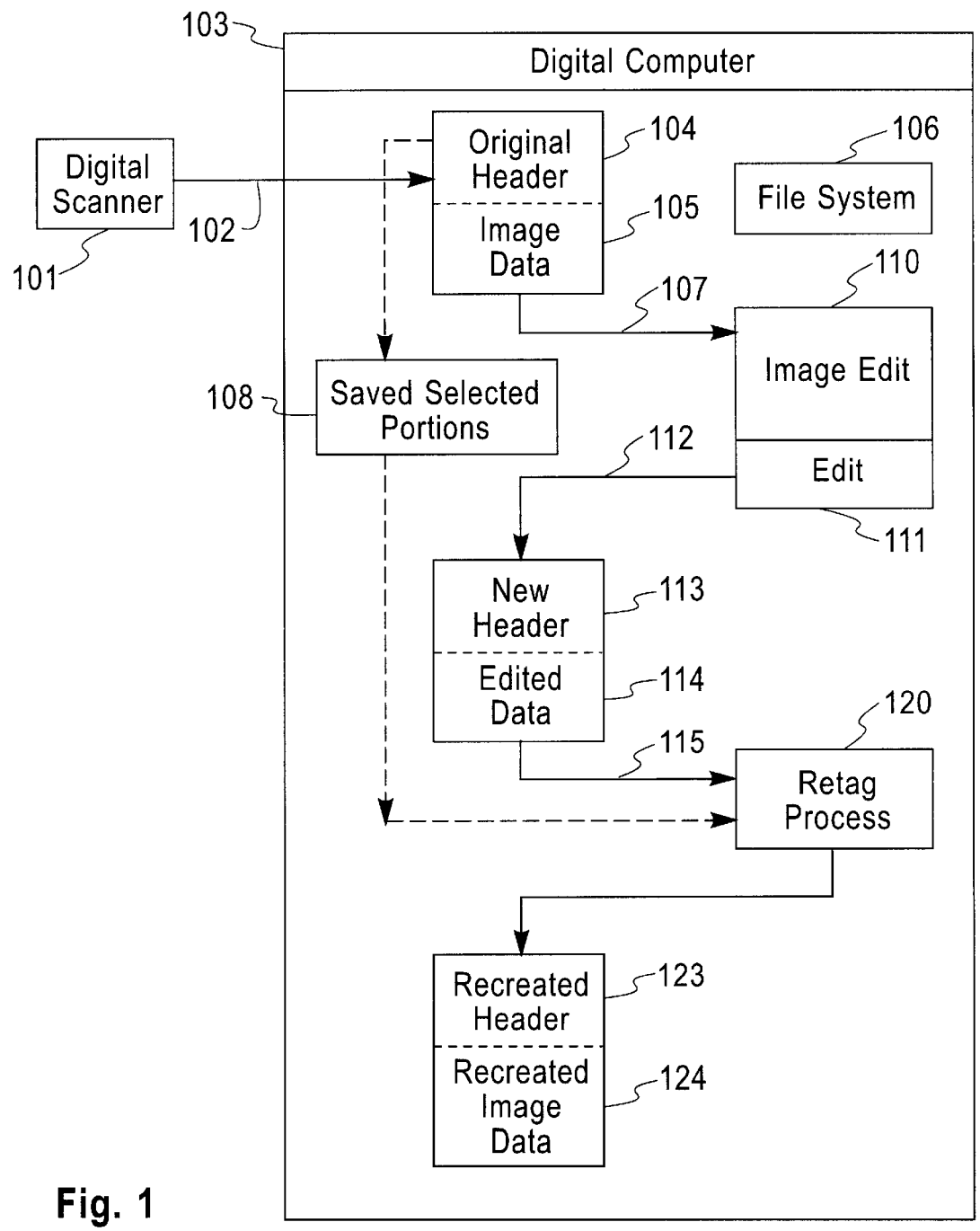
FIG. 1 shows a block diagram of the process in accordance with the present invention.

FIG. 1 depicts a block diagram of a typical embodiment of the invention process. It shows a digital scanner (101) for scanning and digitizing an image (100). Also shown is a digital computer (103) which includes a file system (106). An image file of a particular image (100) is created by a capture process (102). The image file has two parts, an original header (104) and the image data (105). Using an image manipulation package (110), the file is imported via step (107) and edited (111) and then stored in step (112) back to the file system (106). Generally the manipulation package (110) is a commercially available package. A portion or subset of the original header data (104) and/or image data (105) is selected and saved (108). The modified file also has two parts. The two parts include a new header (113) and the edited image data (114). A retag process (120) combines the saved selected portions (108) with the new header (113) to form the recreated header (123). This combined with the edited data from (114) which forms the improved image file output which includes recreated header (123) and recreated image data (124). Generally, the recreated image data (124) is the same as the edited data (114).

Figure 2:
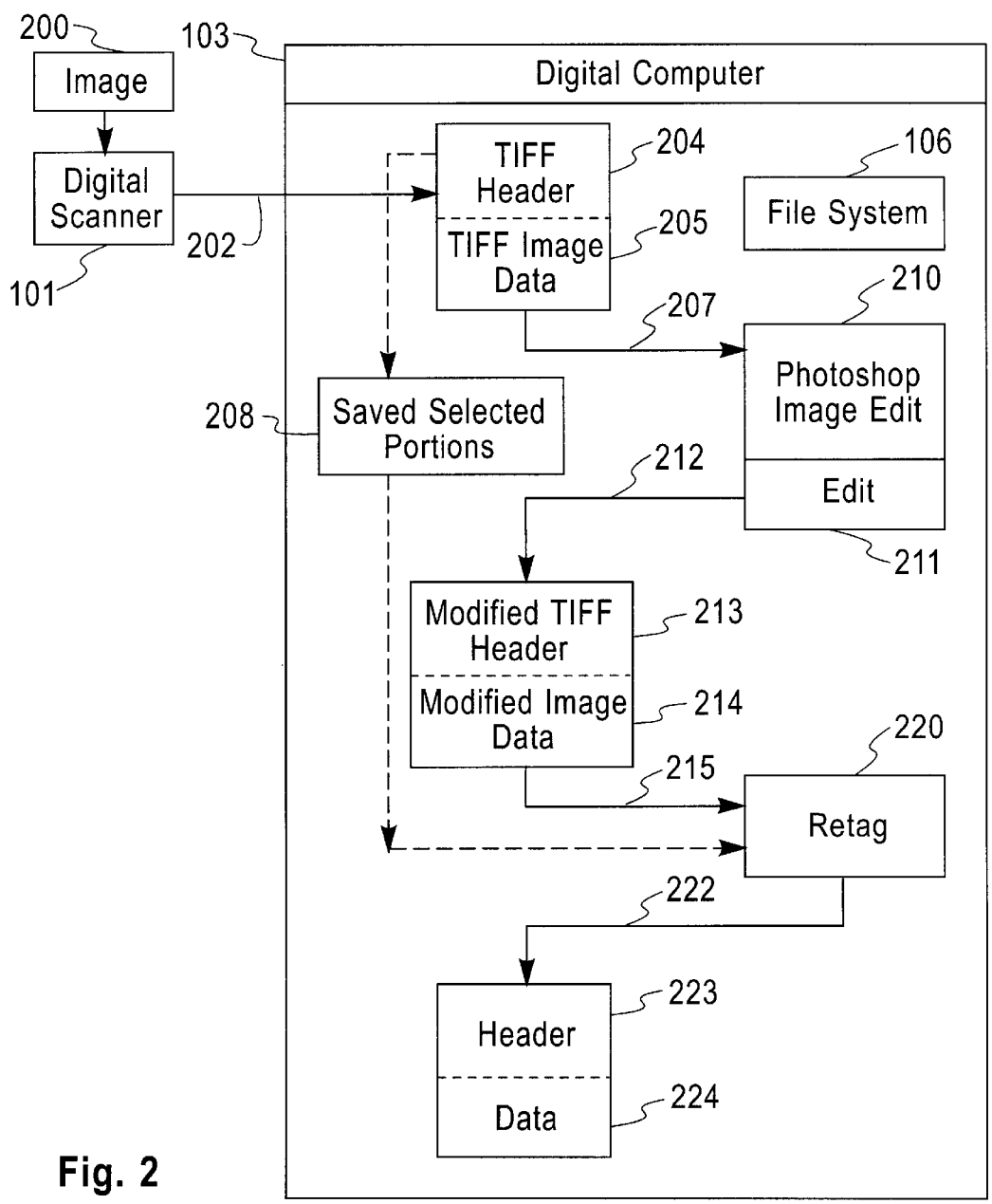
FIG. 2 shows an embodiment of the present invention for an image in TIFF format.

An embodiment specific to the TIFF image format is shown in FIG. 2. FIG. 2 shows a block diagram of the process which starts with a digital scanner (101), to scan an image (200) into a digital computer (103). The computer (103) contains a file system (106). A TIFF file is created by the capture process (202). The TIFF file consists of two parts, a TIFF header (204) and TIFF image data (205). Using a commercially available software package such as the PhotoShop image editor (210), the file is imported via step (207), edited (211) and then stored (212) to the file system (106). A subset or portion of the header data (204) is selected and saved (208). The subset includes information that is useful for maintaining an original quality and/or other details of the image. In a particular embodiment the subset includes all information that may be lost by editing. The modified TIFF file consists of two parts, a modified TIFF header (213) and modified image data (214). The retag process (220) combines the saved selected the portion of the header (208) with the modified TIFF header and with the modified TIFF data from (214) to create (222) the improved TIFF file. The TIFF file includes the recreated TIFF header (223) and the recreated image data (224). In an embodiment, the recreated image data (224) is the same as the modified image data (214).

The details of the tags in the TIFF headers after the retag process are shown in Table 3. This shows an example of restoring some tags not shown in Table 2. Comparing Table 3, to Table 2 shows tags replaced by the retagging process. These tags are marked with an asterisk (*) in Table 3.

TABLE 3

| | Retagged File Structure: | |
|---|---|---|
| Header: | * new Width | tag |
| | * new Length | tag |
| | BitPerSample | tag |
| | SamplesPerPixel | tag |
| | Orientation | tag |
| | * Offset | tag |
| | * Description | tag |
| | * TransferFunction | tag |
| | * DateTime | tag |
| | * WhitePoint | tag |
| | * PrimaryChromaticities | tag |
| | * Copyright | tag |
| Data: | (bytes of image data) | |
| | YY YYYYY YYYYYYYYY | |

Thus one aspect of the present invention is saving tag information that is ordinarily lost to an image file so that it may be reinserted after a manipulation of the image file have been performed. The reinsertion results is a better image quality and is also often useful to preserve important attributes present in the original image data and previously discarded during the manipulation process.

Figure 3:
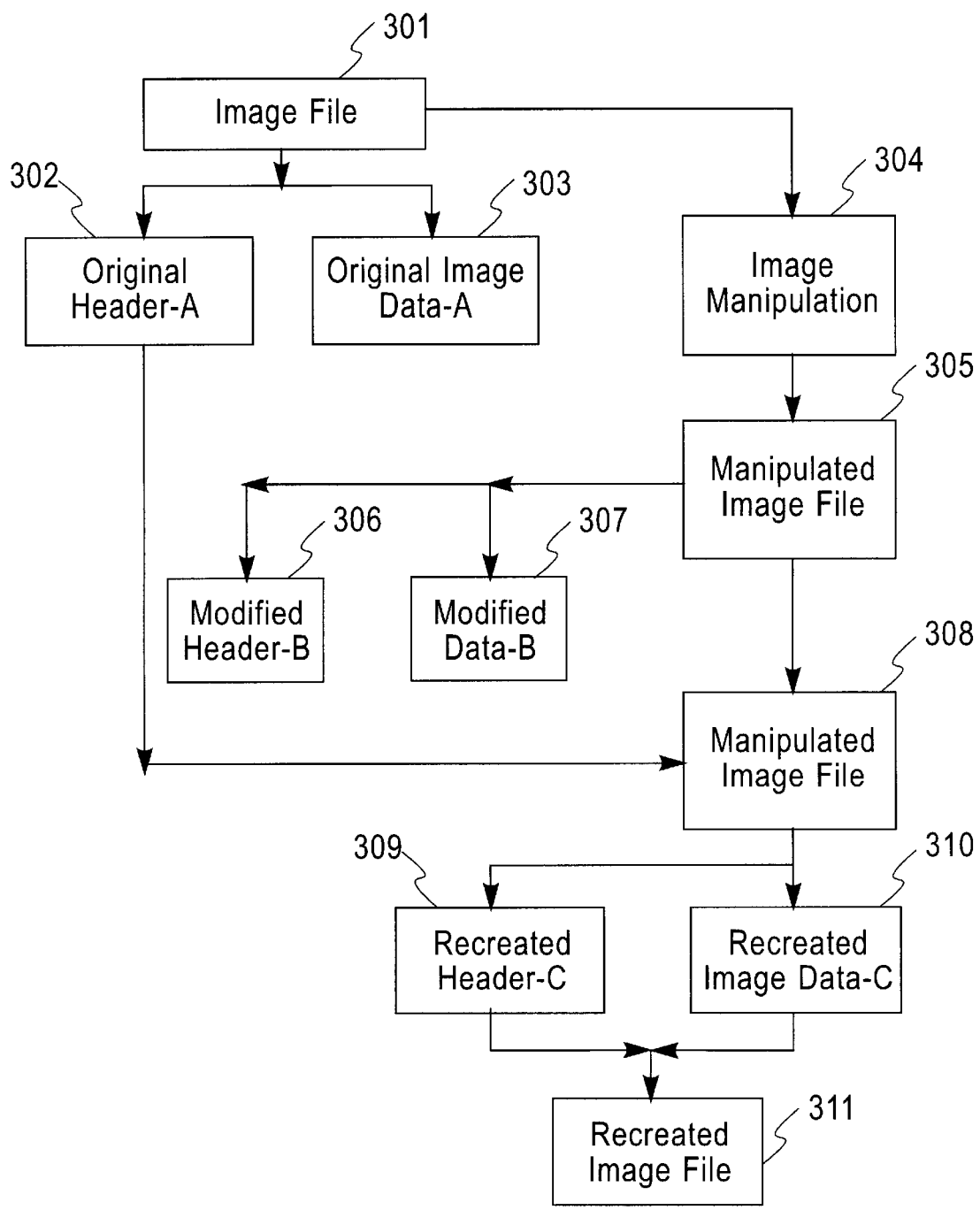
FIG. 3 shows a typical flow diagram of the process in accordance with the present invention.

A method to implement an embodiment of the present invention is shown in a typical flow diagram in FIG. 3.

1. Starting with an original scanned digitized image file (301) represented here by original (Header-A:Image Data-A) and divide the file into two parts, original Header-A (302), and original Image Data-A (303).

2. Modifying the original Image Data-A (303) using some image manipulation commercially available package program such as the PhotoShop editor (304). Typical editing operations include crop, rotating re-size, contrast, brightness, filters, spot removal, etc. These operations discard many header tags.

3. Saving the file manipulated (305) which is comprised of two parts, modified Header-B (306), and modified Data-B (307).

4. Performing the retag process (308) using parts of the original Header-A (302) and manipulated image file (305), to create outputs Header-C (309) and Data-C (310). These together form the recreated image file (311).

It is noted that the invention may be implemented in many formats. The method may be included in a computer program product, in an article of manufacture including a computer useable medium, in a program storage device readable by machine. The invention may be implemented by a system or apparatus performing the method.

Figure 4:
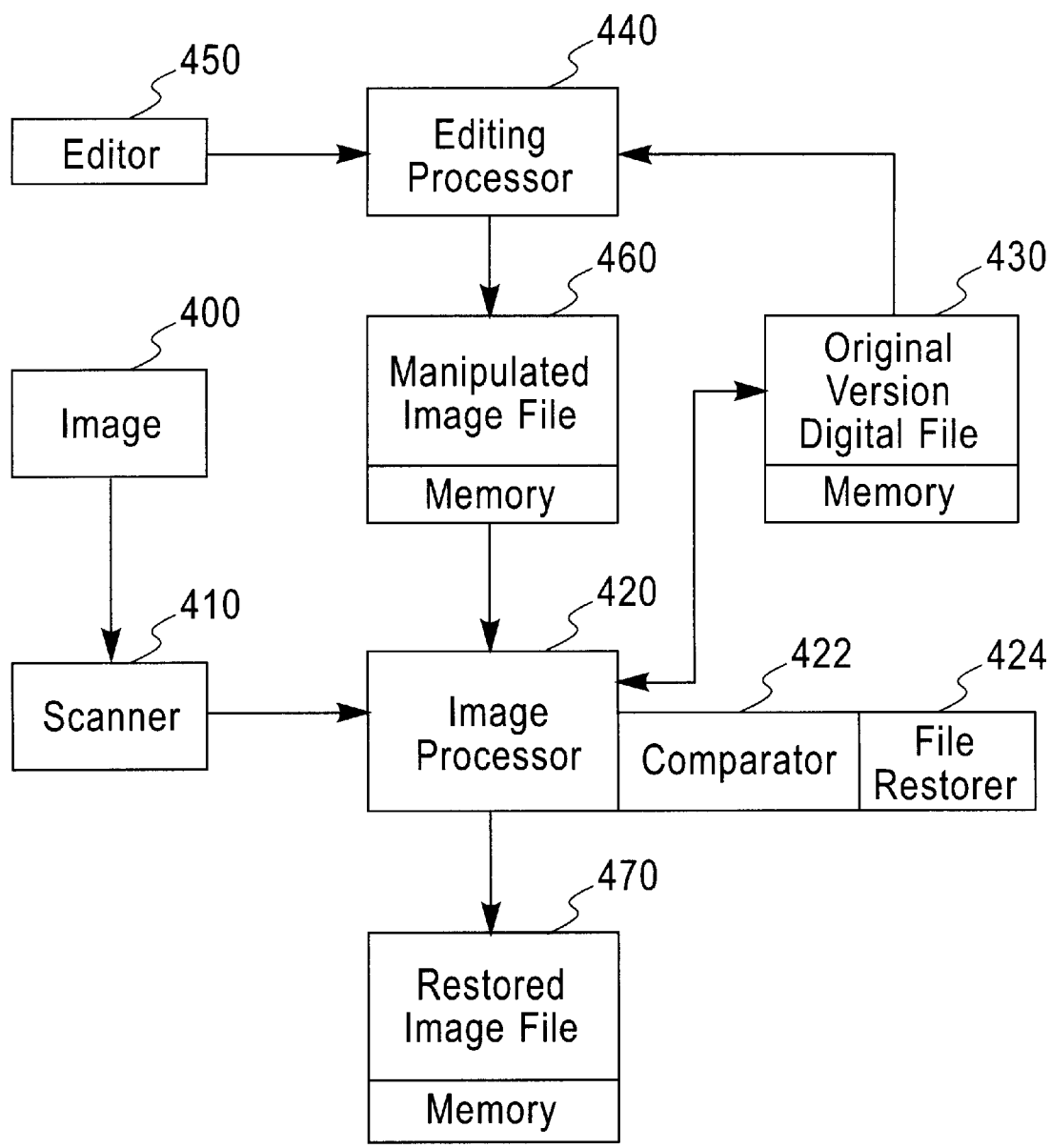
FIG. 4 shows a typical system embodiment of the present invention.

A typical system embodiment is shown in FIG. 4. FIG. 4 shows a digital scanner (420) for scanning an image (400). It shows a processor (420) which receives and processes the scanned file from the scanner (410). The scanned file is stored in an original version memory (430). The original version memory (430) makes the scanned image available to an editing processor (440). In one embodiment the editing processor (440) employs an external commercially available editor (450) such as PhotoShop. The editing processor (440) manipulates the image according to the editing requirements of an image user, and forms the manipulated image file which is stored in a manipulated image file memory (460). The editing process discards one or more pieces of information (a subset of information) which are important to the maintenance of the quality level of the image and/or include pertinent image details. The processor includes a comparator to compare the manipulated image file (460) to the original version digital file (430) to determine which subset of information and/or image details contained in the original version file were discarded and not contained in the manipulated image file. The processor also contains a file restorer (424) to restore all or a portion of the discarded information in a restored image file (470). This enables the user to have a restored image file (470) which maintain a level of quality and/or detail of the original version digital file even after the original version digital file is manipulated one or more times.

It is noted that this invention may be used for many applications. Although the description is made for particular arrangements and applications using TIFF formatting and in relation to editing, the intent and concept of the invention is suitable and applicable to other arrangements and applications. Thus the invention is also directly useful for any file manipulation process which effects and/or modifies a file/image parameter desirable for later use in an original or previous form. It will be clear to those skilled in the art that other modifications to the disclosed embodiments can be effected without departing from the spirit and scope of the invention.

What is claimed is:

1. A method for maintaining a quality level of a digitized image, the method comprising,
   obtaining a first set of information for the image in a first format;
   manipulating the first set of data to provide a modification of the image and forming a second set of information, the second set of information missing a subset of the first set of information;
   employing the first set of information to impart at least a portion of the subset to the second set of information such as to maintain the quality level of the image.

2. A method as recited in claim 1, wherein the step of manipulating includes rotating the image.

3. A method as recited in claim 1, wherein the step of employing returns the portion of the subset without losing the modification produced in the step of manipulating.

4. A method as recited in claim 1, wherein the first format is a TIFF format.

5. A method as recited in claim 3, wherein the first format is a JPEG format.

6. A method as recited in claim 1, wherein the subset includes at least one header tag.

7. A method as recited in claim 1, wherein the steps of manipulating is performed by a first entity and the step of employing is performed by a second entity.

8. A method as recited in claim 7, wherein the step of obtaining is performed by the second entity.

9. A method for maintaining an information level of a digitized image, the digitized image being provided with a first set of information for the image in a first format, the first set of data having been manipulated to provide a modification of the image, the modification being included in a second set of information, the second set of information missing a subset of the first set of information relating to the information level, the method comprising:
   employing the first set of information to impart at least a portion of the subset to the second set of information such as to maintain the information level.

10. A method as recited in claim 9, wherein the step of manipulating includes providing the image with filtering effects.

11. A method as recited in claim 9, wherein the step of employing returns the portion of the subset essentially without losing the modification.

12. A method as recited in claim 9, wherein the first format is a TIFF format.

13. A method as recited in claim 9, wherein the manipulation is performed by a first entity and the step of employing is performed by a second entity.

14. A method as recited in claim 12, wherein the modification is performed on at least one TIFF header of a file representing the image.

15. A method comprising:
   maintaining a quality level of a digitized original image by effecting the steps comprising:
      obtaining a first set of information for the original image in a first format;
      manipulating the first set of data to provide a modification of the image and forming a second set of information, the second set of information missing a subset of the first set of information;
      employing the first set of information to impart at least a portion of the subset to the second set of information such as to maintain the quality level of the original image.

16. A method for maintaining an information level of a digitized image, the method comprising:
   providing the digitized image with a first set of information for the image in a first format, the first set of data having been manipulated to provide a modification of the image, the modification being included in a second set of information, the second set of information missing a subset of the first set of information relating to the information level, and
   employing the first set of information to impart at least a portion of the subset to the second set of information such as to maintain the information level.

17. A computer program product comprising a computer usable medium having computer readable program code means embodied therein for maintaining an information level of a digitized image, the digitized image being provided with a first set of information for the image in a first format, the first set of data having been manipulated to provide a modification of the image, the modification being included in a second set of information, the second set of information missing a subset of the first set of information relating to the information level, the computer readable program code means in said computer program product comprising computer readable program code means for causing a computer to effect employing the first set of information to impart at least a portion of the subset to the second set of information such as to maintain the information level.

18. A system to maintain a quality level of an image represented by an original version digital file, the system comprising:

a processor for receiving and processing the original version digital file;

a first memory for storing the original version digital file received by the processor; and a second memory for storing a manipulated version of the digital file missing a subset of information included in the original version digital file;

the processor including:

a file comparator to compare the manipulated version to the original version, and a file restorer to restore at least a portion of the subset of information to the manipulated version to maintain the quality level of the image in a restored version image file.

19. A system as recited in claim 18, further comprising a scanner to form the original version digital file.

20. A system as recited in claim 18, wherein the subset includes copyright information.

21. A system as recited in claim 18, wherein the original version digitized image is in a TIFF format.

22. A system as recited in claim 21, wherein the subset includes at least one TIFF header.

23. An article of manufacture comprising a computer usable medium having computer readable program code means embodied therein for maintaining a quality level of a digitized image, the computer readable program code means in said article of manufacture comprising computer readable program code means for causing a computer to effect:

obtaining a first set of information for the image in a first format;

manipulating the first set of data to provide a modification of the image and forming a second set of information, the second set of information missing a subset of the first set of information;

employing the first set of information to impart at least a portion of the subset to the second set of information such as to maintain the quality level of the image.

24. An article of manufacture as recited in claim 23, wherein the step of manipulating includes rotating the image.

25. An article of manufacture as recited in claim 23, wherein the step of employing returns the portion of the subset without losing the modification produced in the step of manipulating.

26. A computer program product as recited in claim 17, wherein the manipulation is performed by a first entity and the step of employing is performed by a second entity.

27. A computer program product as recited in claim 17, wherein the step of manipulating includes providing the image with filtering effects.

28. A computer program product as recited in claim 17, wherein the step of employing returns the portion of the subset essentially without losing the modification.

29. A computer program product as recited in claim 26, wherein the first format is a TIFF format.

* * * * *